[19] United States Patent
Shmueli et al.

[15] 3,640,318
[45] Feb. 8, 1972

[54] METHOD AND APPARATUS FOR FILLING A THERMAL MOTOR WITH WAX

[72] Inventors: Kalman Shmueli, Upper Montclair; Robert T. Scott, Boonton Township, Morris County; Wallace R. Mills, Mountain Lake, all of N.J.

[73] Assignee: International Controls Corp., Fairfield, N.J.

[22] Filed: June 25, 1970

[21] Appl. No.: 56,057

Related U.S. Application Data

[63] Continuation of Ser. No. 753,368, Aug. 19, 1968, abandoned.

[52] U.S. Cl. ........................................141/11, 53/25, 141/82
[51] Int. Cl. .........................................B65b 1/04, B65b 3/04
[58] Field of Search ....................141/11, 82, 98, 392; 53/25, 53/36, 127

[56] References Cited

UNITED STATES PATENTS 2,478,754   8/1949   Dubiuer et al. ............................53/36
2,777,480   1/1957   Linda.........................................141/11

Primary Examiner—Houston S. Bell, Jr.
Attorney—Nolte and Nolte

[57] ABSTRACT

A method and apparatus for filling a thermal motor with wax. The thermal motor has an inlet and outlet ports and it also has an axially bored piston. The thermal motor is oriented with the inlet and outlet ports located at the uppermost part of the motor. Liquid wax is then introduced through the inlet port and discharged through the outlet port. After the interior of the motor has become filled with liquid wax, a chilling fluid is directed through the piston to bring about progressive chilling and solidification of the wax from the lower toward the upper end of the thermal motor. Thereafter, chilling is provided at the region of the outlet port to provide a wax plug at the outlet port, and finally, chilling is provided at the region of the inlet port to provide a wax plug at the inlet port. These operations are brought about by way of a suitable filling head having supply and discharge lines for the liquid wax. The filling head has passages chilled and cooled simultaneously with the chilling and cooling of the inlet and outlet port regions of the thermal motor by suitable temperature-control means.

16 Claims, 2 Drawing Figures

PATENTED FEB 8 1972

3,640,318

INVENTORS
KALMAN SHMUELI
ROBERT T. SCOTT
WALLACE R. MILLS

BY

*Nolte & Nolte*
ATTORNEYS

METHOD AND APPARATUS FOR FILLING A THERMAL MOTOR WITH WAX

This is a continuation of application Ser. No. 753,368, filed Aug. 19, 1968 and now abandoned.

BACKGROUND OF THE INVENTION

The present invention relates to the manufacture of thermal motors.

In particular, the present invention relates that stage in the manufacture of a thermal motor where the motor is filled with wax. Reference may be made, for example, to U.S. Pat. application Ser. No. 702,920, filed Feb. 5, 1968, which shows an example of a thermal motor which has its hollow interior filled with wax.

In the filling of such thermal motors with wax, problems are encountered because it is essential for the best possible operation of the thermal motor that the hollow interior thereof be completely filled with wax. In fact, not only is it important that the hollow interior of the thermal motor be completely filled with wax, but in addition it is important that the wax be as dense as possible since any voids or low density areas in the wax will become compressed and will be reduced or eliminated when a force is applied to the piston of the motor during the first functional cycle thereof. The result of such voids or low density areas is that an indeterminate amount of displacement of the piston takes place, from the original position thereof when the motor was first filled with wax, so that there is an undesirable variation in the operating characteristics of one thermal motor with respect to another thermal motor which in fact should operate in precisely the same way.

SUMMARY OF THE INVENTION

It is, accordingly, a primary object of the present invention to provide a solution to the problem of filling thermal motors with wax.

In particular, it is an object of the invention to provide a method and apparatus which make it possible to fill the hollow interior of a thermal motor with wax in such a way that the entire hollow interior of the thermal motor is provided with wax at a maximum density and with a minimum of voids.

A still more particular object of the invention is to provide a method and apparatus which make it possible to fill the hollow interior of a thermal motor initially with liquid wax which, upon cooling and solidification, will have a maximum density and a minimum of voids.

The objects of the present invention also include the provision of a method and apparatus for achieving a complete filling of the hollow interior of the thermal motor with cool, solidified wax even though, during cooling, liquid wax will shrink to an extent of 5–15 percent.

In accordance with the invention, the method and apparatus are applied to a thermal motor of the type shown in the above application Ser. No. 702,920 where an elongated axially bored piston extends through and beyond opposed end walls of the motor. One of these end walls has inlet and outlet ports through which the wax can flow into and out of the case or housing of the motor. The motor is initially oriented, by being operatively connected with a filling head of the apparatus of the invention, in such a way that the end which has the inlet and outlet ports is situated at the highest part of the motor with the outlet port situated higher than the inlet port. Liquid wax is introduced through the inlet port and fills the hollow interior of the motor while flowing out through the outlet port, so that initially the entire interior of the motor will be filled with liquid wax. At this time, a cooling fluid is directed through the axially bore of the piston to chill the wax progressively from the lower toward the upper end of the motor, and flow of the liquid wax into the inlet and out through the outlet port is maintained as the wax progressively chills and solidifies upwardly toward the upper end of the motor. The maintenance of the liquid wax at the upper portion of the motor will compensate for shrinking of the wax during solidification thereof.

Then, at a given moment during these operations, the region of the motor at its outlet port is chilled to form a plug of wax at the outlet port, and at this time liquid wax is still maintained at the inlet port. Thereafter, the wax is chilled at the inlet port to provide a plug of wax closing the inlet port, and in this way the motor is completely filled with solidified wax at maximum density.

The apparatus includes suitable temperature-control means and conduit means for bringing about flow of the required fluids at the required temperatures to achieve the filling of the motor case initially with liquid wax and the solidification of the latter in such a way that solidified wax at maximum density completely fills the interior of the thermal motor.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
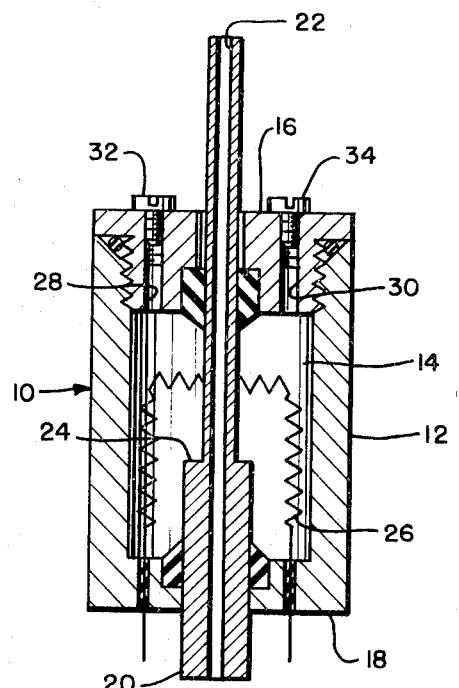
FIG. 1 is a schematic sectional elevation of a thermal motor capable of being filled with wax according to the method and apparatus of the present invention.
Figure 1:
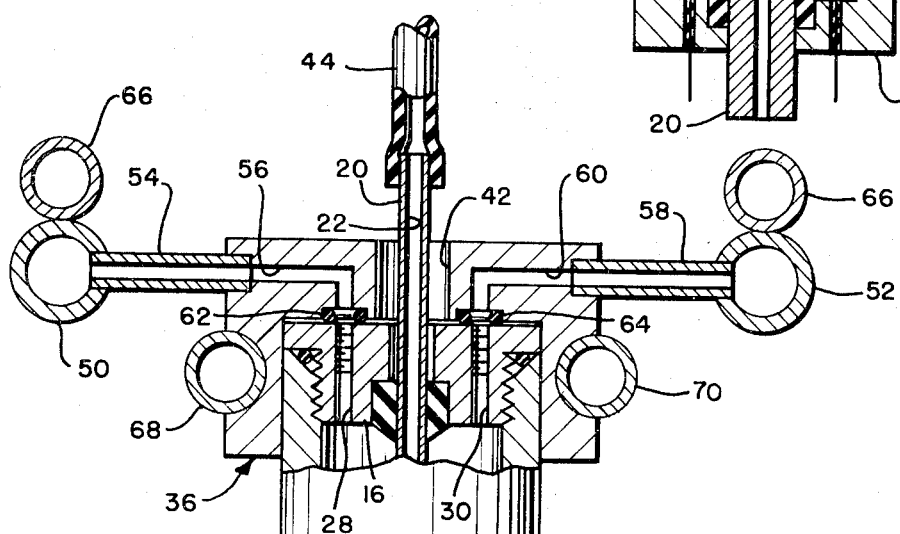

Referring now to FIG. 1, the schematically illustrated thermal motor 10 shown therein includes a case or housing 12 which has the hollow interior 14 which is to be filled with wax. The motor 10 has a pair of opposed ends 16 and 18 through and beyond which a piston 20 slidably extends in a fluidtight manner. The piston 20 is formed with an axially bore 22. In the interior of the motor 10, the piston 20 has a shoulder 24 to be acted upon when the wax is heated, as by energizing of the schematically illustrated heating element 26.

The end 16 of the thermal motor 10 is provided with an inlet port 28 and outlet port 30 used in connection with the filling of the interior 14 with wax. The inlet port 28 is closed by a screwplug 32 while the outlet port 30 is closed by a screwplug 34.

Figure 2:
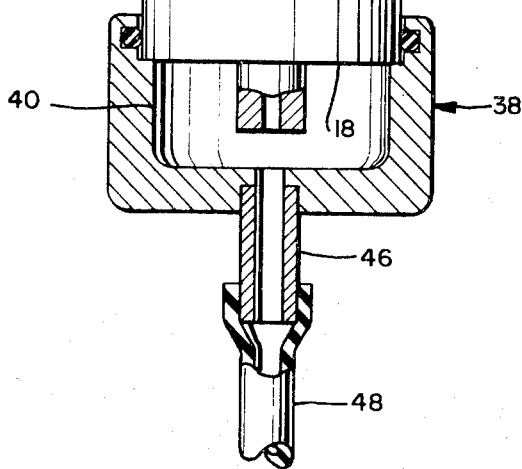
FIG. 2 is a schematic longitudinal sectional illustration of an apparatus of the invention coacting with the thermal motor of FIG. 1, partly illustrated in section in FIG. 2, FIG. 2 also illustrating the method of the invention.

FIG. 2 illustrates one possible embodiment of a wax-filling fixture forming the apparatus of the invention. The thermal motor 10 is clamped between an upper filling head 36 and a lower water collector 38 which defines a chamber 40 receiving the entire lower end 18 of the motor 10. The collector 38 can be guided for axial movement with any suitable structure so that after the top end of the motor 10 is received in the annular ring-shaped filling head 36, the collector 38 can be advanced to the position shown in FIG. 2 engaging the motor 10 in the manner illustrated.

Because of the annular configuration of the filling head 36, it is formed with an axial opening 42 extending completely therethrough enabling the filling head 36 to surround, with clearance, the piston 20 at the region where it extends beyond the end 16 of the motor. Thus, this piston 20 can also extend through and beyond the filling head 36 in the manner illustrated in FIG. 2. The collector 38 forms part of a conduit means which communicates with the axial bore 22 of the piston 20, and this conduit means includes a tube 44 placed in fluidtight communication with the upper end of the piston 20 as well as outlet tube 46 leading from the chamber 40 and connected with an additional tube 48. Thus, this conduit means formed by the components 38, 44, 46 and 48, enables a cooling fluid, such as cold water, to flow through the bore 22 for the purpose of chilling wax in the motor 10, in a manner described in detail below. It is to be noted that because the entire bottom end 19 of the motor 10 is received in the chamber 40, when the latter becomes filled with a cooling fluid such as cold water, the entire bottom end of the motor 10 can be chilled.

A circuit for liquid wax includes a liquid-wax supply conduit 50 and a liquid-wax return conduit 52, the remainder of the circuit for the liquid wax being unillustrated. This circuit includes, for example, a tank which contains a suitable supply of liquid wax, a pump for pumping the wax into the supply line or conduit 50, and the return conduit 52 for returning liquid wax to this tank.

The conduit 50 communicates through a tube 54 with an inlet or supply passage 56 which is formed in the filling head 36, while the conduit 52 communicates through a tube 58 with an outlet or discharge passage 60 formed in the filling head 36. The inlet passage 56 and the outlet passage 60, respectively terminate in inner open ends which are spaced from each other in precisely the same way as the inlet port 28 and outlet port 30 of the motor 10 so that when the latter is received in the filling head the inlet passage 56 and outlet passage 60 will respectively communicate with the inlet port 28 and the output port 30 in the manner illustrated in FIG. 2. Suitable O-rings 62 and 64 are provided in the filling head at the inner open ends of the passages 56 and 60, respectively, so as to assure a fluidtight connection between the filling head and the inlet and outlet ports of the thermal motor 10. A hot-water conduit 66 extends along and engages the supply conduit 50 and return conduit 52 for the liquid wax so as to maintain the wax in liquid condition throughout the supply and return circuit. Thus, the conduit 66 forms a temperature-control means for maintaining the wax in the circuit in a liquid condition at all times.

A pair of additional temperature-control means 68 and 70 are provided. These temperature-control means respectively are in direct engagement with the filling head 36 at the region where the inlet port 28 and outlet port 30 are located, and the pair of temperature-control means 68 and 70 may take the form of a pair of conduits through which hot or cold water is respectively directed to achieve the required temperature variations. These conduits 68 and 70 are independent of each other and are controlled so as to receive cold or hot water in a selected manner referred to below.

In some cases where it is not desired to chill the entire end 18 of the thermal motor, the tube 48 can be connected directly to the lower end of the piston 20 in the same way that the tube 44 is connected to the upper end thereof, and the collector 38 and tube 46 can be omitted.

During each filling cycle, the pair of conduits 68 and 70 are provided with hot water, while between filling cycles they are provided with cold water in a sequential manner referred to below, so as to achieve chilling of the wax and creation of solid wax plugs in the filling head 36 so as to eliminate the need for valves.

With this apparatus of the invention, the method of the invention, during a typical filling cycle, will involve removing the plugs 32 and 34 and placing the thermal motor 10 in the position indicated in FIG. 2. With the inlet and outlet ports 28 and 30 respectively communicating with the inlet ports 28 and 30 respectively communicating with the inlet and outlet passages 56 and 60, the parts are clamped so that they will remain in the position shown in FIG. 2. Now hot water is directed through the conduits 68 and 70 so as to heat the filling head 36, thus melting the wax plugs at the passages 56 and 60 so as to open these passages. The liquid was will now circulate from the supply line 50 through the inlet port 28 into the hollow interior 14 of the motor 10, and as the interior 14 becomes filled with wax, any air or gases therein are displaced out through the outlet port 30. By situating this port 30 together with the upper end 16 of the motor at the highest elevation thereof, the entire interior of the motor will become filled with liquid wax which flows out through the outlet 30 and back to the return line 52 when the hollow interior 14 is completely filled with liquid wax.

At this time, cold water is directed through the axial bore 22 of the piston 20, and the flow of liquid wax into and out of the interior of the thermal motor is maintained. The cold water is directed through the bore 22 by way of the conduit means formed by the tube 44, the collector 38 and the tubes 46 and 48. As a result, the liquid wax will progressively solidify from the lower interior portion of the thermal motor upwardly toward the upper interior portion thereof where the flow of liquid wax is maintained. Thus, during this phase of the method, the heating of the filling head 36 and the circulation of the liquid wax continues to maintain the wax in a liquid condition at the upper interior portion of the case of the motor 10.

After the wax has solidified in the lower interior portion of the motor 10, cold water is directed through the conduit 70 and the flow of hot water therethrough is terminated. This switching over from hot to cold water in the conduit 70 at this time results in the formation of a wax plug at the outlet port 30 so that the solidification of the wax continues to progress upwardly toward and up to the outlet port 30. However, the hot water is maintained in the conduit 68 so that liquid wax can still flow into the interior 14 of the motor 10 to the inlet port 28, thus compensating for any shrinkage which takes place during the solidification of the wax.

Thus, at this time, only the wax at and adjacent to the inlet port 28 is still in liquid condition due to the maintenance of hot water flowing through the conduit 68. Then this conduit 68 is also switched over from hot to cold water, so as to bring about chilling at the inlet port 28, forming a plug at the inlet port 28, and now the filling operations are completed. Of course, plugs of wax will also form at the inlet passages 56 and 60 due to the chilling derived from the conduits 68 and 70, so that when the motor 10 is now removed the inlet and outlet passages of the filling head 36 will be closed. Upon removal of the motor 10 from the fixture, the pair of sealing screws 32 and 34 are replaced, and now the above operations can be repeated with the next unit.

With the apparatus and method of the invention described above, the wax is introduced in such a way that there are a minimum of voids and a maximum density of the solidified wax. During the initial filling of the interior 14 of the motor with the liquid wax, this interior of the motor forms part of the circuit from the wax reservoir to the inlet port and from the outlet port back to the reservoir. The circulating liquid wax at this time entrains and removes all air from the interior of the thermal motor, resulting in complete filling of the hollow interior of the motor with the liquid wax. The pump of the circuit forces the liquid wax through the hollow interior of the motor with a sufficient velocity to cause turbulence which assists in dislodging any bubbles and pockets of air. The flow of liquid wax is maintained until all of the air is eliminated and until the entire thermal motor becomes heated up to the temperature of the liquid wax. At this time, the cooling cycle commences.

During the cooling phase, the liquid wax will shrink on the order of 5–15 percent, and the maintenance of liquid wax at the upper portion of the cavity during solidification of the wax at the lower portion thereof will compensate for this shrinkage enabling additional liquid wax to enter so as to make up for the shrinkage. In order to achieve a maximum "fill," the wax is cooled and solidified progressively from the bottom toward the top as described above so that the inlet port 28 is the last part of the motor where solidification of the wax takes place. In this way, additional liquid wax is introduced into the hollow interior of the motor as the solidifying wax shrinks.

The particular design of the motor will determine the most advantageous location of the inlet and outlet ports. In general, both of these ports will be located at the same end of the motor as shown in the above example. The continuation of the circulation of wax during the initial part of the cooling phase is also desirable inasmuch as some wax may contain dissolved air which outgases as the wax solidifies.

The cooling is thus initiated at a part of the interior of the motor which permits progressive solidification toward the ports without any entrapment of liquid wax. Such entrapped liquid wax would shrink upon cooling and would be unable to draw in more liquid wax, thus resulting in an undesirable void. The temperature controls provided with the method and apparatus of the invention at the region of at least one and preferably both of the ports assure an operation where these ports are the last parts of the motor to cool with the inlet port cooling after the outlet port.

While hot and cold water have been referred to as the heating and cooling mediums above, it is also possible to use fluids such as hot and cold air, and, of course, electrical heating elements may be used for heating purposes, if desired.

What is claimed is:

1. A method for filling with wax the hollow interior of a thermal motor having an axially bored piston extending through opposed ends of the motor and having inlet and outlet ports at one end thereof comprising introducing liquid wax into the interior of the thermal motor through said inlet port and out said outlet port so as to fill the interior of said thermal motor with said liquid wax then cooling said wax so that cooling and solidification progresses outwardly from said piston and in a progressive directional manner towards the end of the motor having said ports.

2. Method according to claim 1, which comprises continuously introducing said wax until all of the air present in said interior is eliminated and the motor has been heated to the temperature of the liquid wax.

3. Method according to claim 1 which comprises cooling said wax so that the wax in the region of the inlet port solidifies last.

4. Method according to claim 1 which comprises orienting said motor so that during the introduction of the wax the outlet port is located at the highest position of said motor.

5. Method according to claim 1 which comprises effecting said cooling by flowing a cooling fluid through said axially bored piston.

6. In a method for filling, with wax, the hollow interior of a thermal motor provided at one end with inlet and outlet ports and having an axially bored piston extending through opposed ends of the motor, the steps of orienting the motor with said one end thereof situated higher than the remainder of the motor and with said outlet port situated at a higher elevation than inlet port, directing liquid wax into the interior of the thermal motor through said inlet port thereof and out through said outlet port, so as to fill the interior of the thermal motor with liquid wax, then directing a cooling fluid through the axially bored piston while maintaining liquid wax flowing through the motor so as to provide chilling and solidifying of the wax progressively toward said one end of the motor, then chilling the motor in the region of said outlet port to form a wax plug at said outlet port while simultaneously maintaining the wax in liquid condition at said inlet port, and then chilling said motor in the region of said inlet port to provide for final solidification of the wax in the motor.

7. In the method of claim 6, closing said inlet and outlet ports after solidification of the wax at said inlet port.

8. In the method of claim 6 wherein liquid wax circulating lines are respectively placed in communication with said inlet and outlet ports with said lines initially having wax plugs at the location where they respectively communicate with said inlet and outlet ports to prevent the flow of liquid wax, the step of heating the lines at the region where they communicate with said inlet and outlet ports for melting the latter wax plugs to start the flow of wax into the interior of the thermal motor.

9. In the method of claim 6 wherein the heating and chilling of said thermal motor at the region of its inlet and outlet ports is brought about with hot and cold water acting as the heating and chilling fluid.

10. In the method of claim 6 wherein cold water is directed through the axial bore of the piston of the motor as the fluid which initiates the solidification of the wax in the motor.

11. An apparatus for filling the hollow interior of a thermal motor with wax, said motor having inlet and outlet ports at one end thereof, an axially bored piston passing through opposed ends thereof, a filling head for engaging said thermal motor at said one end thereof, said filling head having supply and discharge passages for liquid wax terminating in opened ends positioned for cooperating with said inlet and outlet ports of said motor when said one end of said thermal motor is mounted at said filling head whereby liquid wax will be supplied to the interior of the thermal motor fluid supply passage of said filling head and discharged from the interior of the motor through said discharge passage of said filling head, means communicating with said opposed open ends of said axially bored position for directing a cooling fluid therethrough to provide progressive solidification of the wax in said thermal motor outwardly from said piston and towards said end of said motor having ports and temperature, control means operatively connected with said filling head for controlling the temperature of the wax at the regions of the open ends of said supply and discharge passages and at the inlet and outlet ports of the thermal motor.

12. In an apparatus for filling, with wax, the hollow interior of a thermal motor which has inlet and outlet ports at one end and which has an axially bored piston passing through opposed ends of the motor, a filling head for engaging the thermal motor at said one end thereof, said filling head having supply and discharge passages for liquid wax terminating in open ends positioned with respect to each other in the same way that said inlet and outlet ports are positioned with respect to each other so as to communicate therewith when said one end of said thermal motor is mounted at said filling head, whereby liquid wax will be supplied to the interior of the thermal motor through said supply passage of said filling head and discharged from the interior of the motor through said discharge passage of said filling head, conduit means communicating with opposed open ends of the axially bored piston for directing a chilling fluid therethrough to provide progressive solidification of wax in the thermal motor from an end thereof opposed to said one end toward said one end, and a pair of temperature-control means operatively connected with said filling head in the region of the locations where said supply and discharge passages terminate for controlling the temperature of the wax at the regions of the open ends of said supply and discharge passages and for controlling the temperature of the wax at the inlet and outlet ports of the thermal motor.

13. The combination of claim 12 and wherein said temperature-control means are each in the form of a conduit through which hot and cold water is adapted to flow.

14. The combination of claim 12 and wherein a pair of conduits for liquid wax respectively communicate with said supply and discharge passages of said filling head distant from the open ends thereof, and means coacting with said pair of conduits for maintaining wax therein in a liquid condition.

15. The combination of claim 12 and wherein said filling head is of an annular configuration for surrounding said one end of said thermal motor while receiving said one end thereof in said filling head, and said annular filling head also surrounding said piston of said motor with said piston extending at one end through and beyond said filling head to be connected with said conduit means for the chilling fluid which flows through the axial bore of said piston.

16. The combination of claim 12 and wherein said conduit means which communicates with the axially bored piston includes a hollow chamber for receiving an end of the thermal motor distant from said one end thereof with the axially bored piston extending with clearance into said chamber and said chamber having an outlet so that chilling fluid will collect in said chamber to chill an entire end region of the motor before the chilling fluid flows out of said chamber through said outlet thereof.

* * * * *